United States Patent [19]

Moineau

[11] Patent Number: 4,974,807
[45] Date of Patent: Dec. 4, 1990

[54] GOLF CART UMBRELLA HOLDER

[75] Inventor: Joseph H. Moineau, Marlboro, Mass.

[73] Assignee: Automatic Specialities Inc., Marlboro, Mass.

[21] Appl. No.: 398,231

[22] Filed: Aug. 24, 1989

[51] Int. Cl.$^5$ ............................................. F16M 13/00
[52] U.S. Cl. ...................... 248/539; 224/274; 224/275; 248/524; 248/540; 280/DIG. 5
[58] Field of Search ............... 248/539, 540, 524, 541, 248/96, 314; 224/915, 42.45, 42.42, 275, 274; 280/DIG. 5, DIG. 6

[56] References Cited

U.S. PATENT DOCUMENTS

| | | | |
|---|---|---|---|
| 503,338 | 8/1893 | Woods | 248/540 X |
| 593,360 | 11/1897 | Lottermoser | 248/541 |
| 2,454,458 | 11/1948 | Kaetker | 248/540 X |
| 2,632,320 | 3/1953 | Liss | 248/314 X |
| 3,148,851 | 9/1964 | Condon | 248/540 X |
| 4,008,874 | 2/1977 | Conway | 280/DIG. 6 X |
| 4,334,692 | 6/1982 | Lynch | 224/274 |
| 4,550,930 | 11/1985 | Proffit | 224/274 X |

FOREIGN PATENT DOCUMENTS

| | | | |
|---|---|---|---|
| 33681 | 7/1928 | France | 248/541 |
| 86129 | 1/1921 | Switzerland | 248/539 |
| 9074 | of 1897 | United Kingdom | 248/541 |

Primary Examiner—David L. Talbott
Attorney, Agent, or Firm—Richard P. Crowley

[57] ABSTRACT

The present invention provides an umbrella holder for mounting an umbrella in an upright position. The umbrella holder which includes, a lower handle support member, slideably mounted on the midsection of a support rod having an upper shaft support guide on the upper distal end with the lower end threaded into a bracket the opposite end of which includes a mounting bracket assembly for engaging a mobile or stationary base.

The lower handle support member includes a plurality of horizontally oriented parallel basket rings having a common axis weldably secured to an intermediate upright rib having an attached cylindrical pencil holder tube which will accept a pencil and an upright L-wire mounted on a hub having an inner bore which slideably receives the support rod and includes a threaded locking knob for locking the hub in place.

The umbrella holder may be mounted on a mobile or stationary base secured by bolts by a mounting bracket assembly attached to the base of the bracket, including tabs and a knob for cooperation with the base.

12 Claims, 1 Drawing Sheet

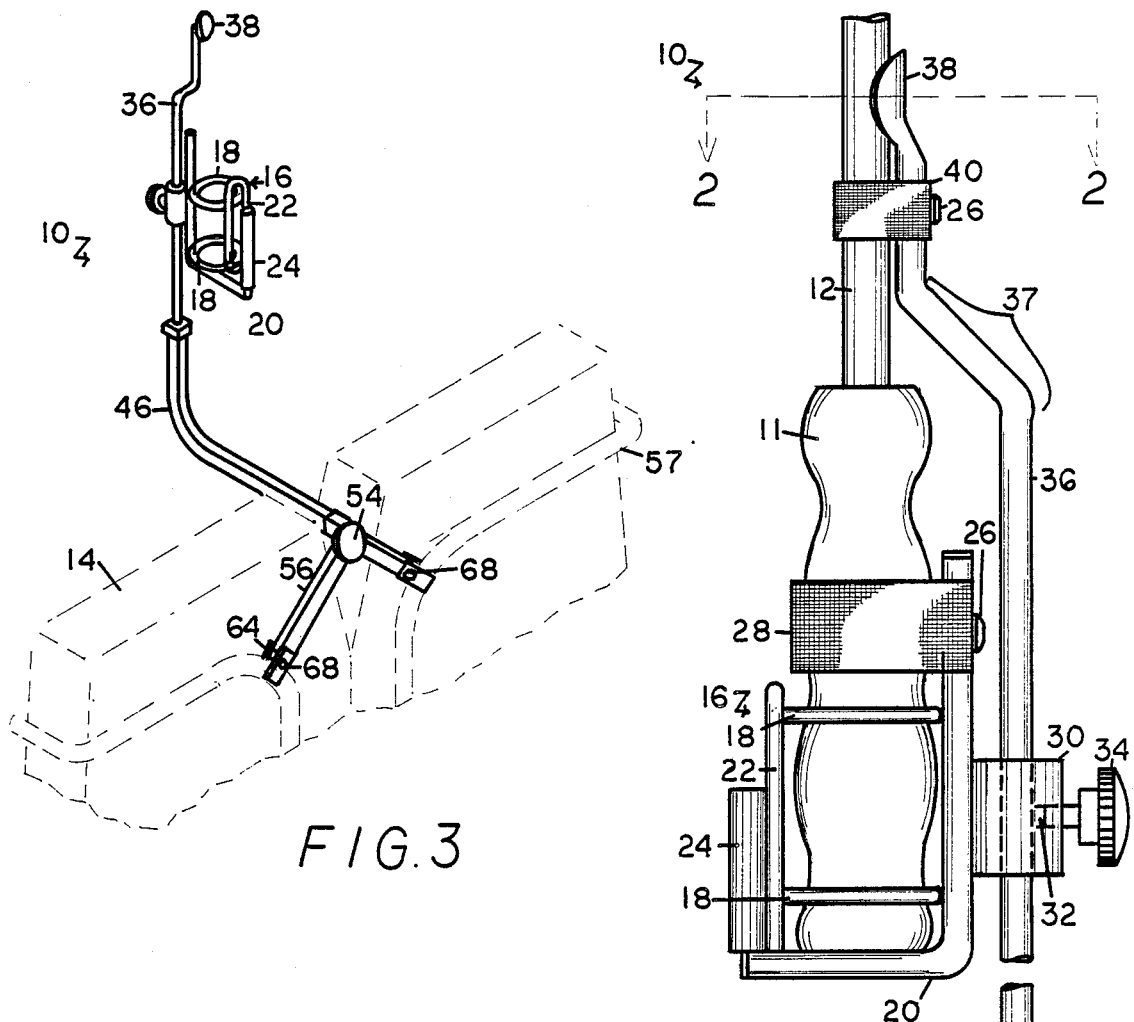
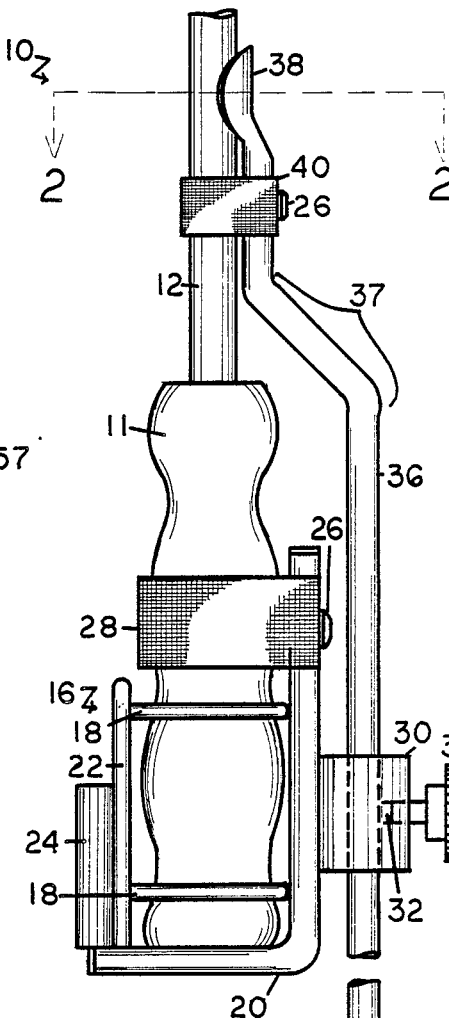
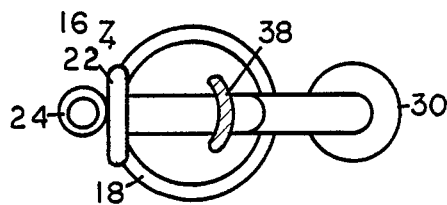
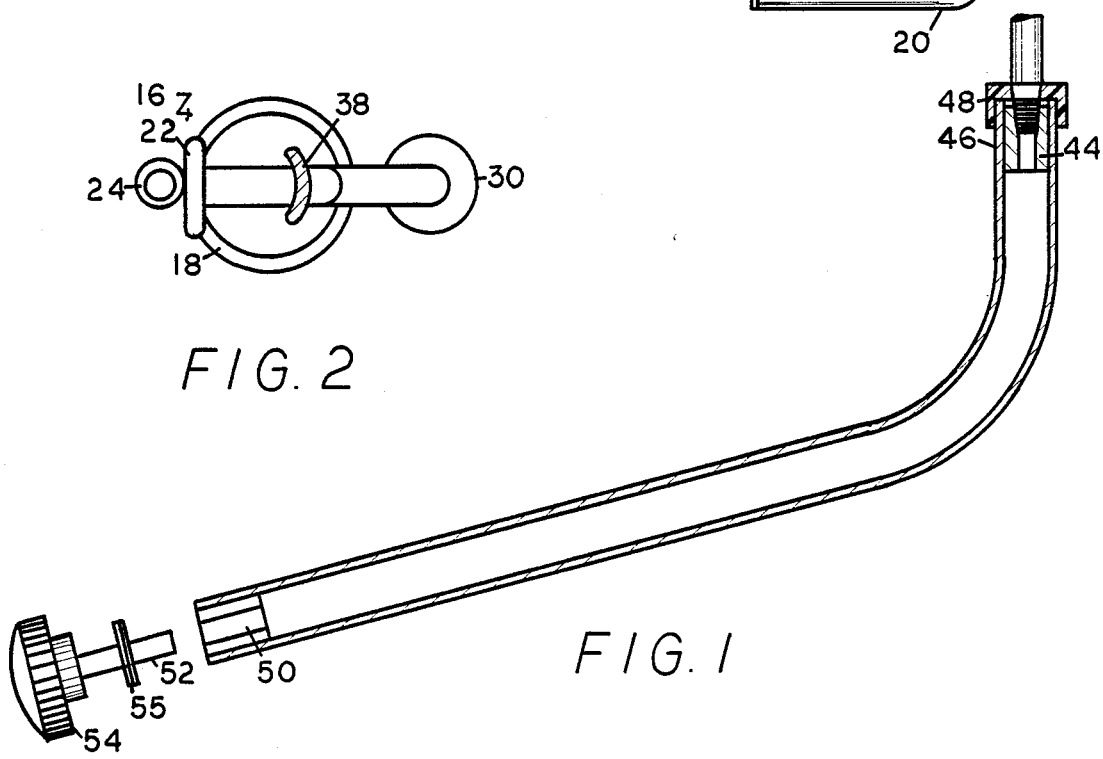
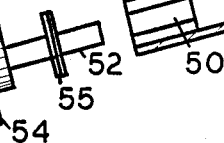

GOLF CART UMBRELLA HOLDER

BACKGROUND OF INVENTION

This invention relates to a holder for supporting an umbrella with a plurality of support components, in an upright position in either the open or furled mode. More particularly, this invention relates to an umbrella holder to be securely mounted upright on a stationary or mobile base such as the seat of a golf cart, in a manner permitting the umbrella being supported to be opened without disengaging any of the support components, yet also provide for quick release of the umbrella from the holder, and may be adjusted heightwise to suit the user.

Umbrellas selected for use by participants in sporting activities are large, yet fragile and are cumbersome to carry, especially when not in actual use. The conventional umbrella rack has a base and one or more rack enclosures for receiving an umbrella tipfirst when downwardly directed, only when furled, with the umbrella handle extending upwardly. Anytime an umbrella is inserted handlefirst in such a conventional umbrella rack, there is substantial risk of damage by bending or breaking one or more of the umbrella's retractable ribs supporting the umbrella fabric, thereby rendering the umbrella unuseable.

Umbrellas are particularly useful on golf courses due to the long distances to be traveled by a player away from shelter and the frequent risk of rain showers. When participating in the game of golf, a golf player usually carries a golf umbrella in addition to a golf bag and set of golf clubs. It is also common for golfers to use a golf cart for their own transport as well as carriage of their clubs, golf bag and umbrella.

At times of use of the umbrella to protect the user/participant from the elements, be it from rain or bright sunlight, the umbrella must be hand-held, encumbering the use of one hand of the user. While riding on a golf cart, a golfer's umbrella must either be hand-held contemporaneously with operating the golf cart, with attendent risk of misadventure due to lack of control of the golf cart or limited vision resulting from the umbrella blocking the users line of sight, or held in a rack fixed to the golf cart. Whenever the player gets out of the cart to play his or her ball in the rain, it is desireable to remove the umbrella from the cart to be carried to the situs of the golf ball in play to keep from getting wet. One prior solution for mobile carts for sporting events has been to securely fasten the umbrella or rain shield to the cart thereby freeing both hands of the operator. Having the fixed the umbrella to the cart, the user cannot disengage it for use away from the cart. Furthermore, any umbrella used for sporting events such golf, which is only supported by its handle, whether hand-held or attached to a motorized base is subject to being tipped over, warped, and damaged by over-extension in response to the strong winds which accompany rainstorms.

It is an object of the present invention is to provide an umbrella holder which provides a secure mount for an umbrella with the umbrella tip upright open, and for quick release of the umbrealla at the option of the user, with a bracket for cooperation with a stationary or mobile base.

Another object of the present invention is to provide a heightwise adjustable umbrella holder, which may be adjusted to suit the needs of the user, and be adapted to cooperate with a plurality of sizes of umbrella handles.

A further object of the present invention is to provide a secure multiple component support system for an umbrella to prevent bending or tipping due to external forces including the force of the wind, and yet also provide for quick release of the umbrella from the support components at the option of the user.

Another object of the present invention is to provide an umbrella holder for mounting on golf cart which holds the umbrella shaft in a position out of the line of sight of the operator.

SUMMARY OF THE INVENTION

The present invention is directed to an improved umbrella holder mounted to a stationary or mobile base for securely mounting an umbrella with its tip upright in the open position which is particularly useful in transporting a large, so called "golf" "umbrella" on a golf cart positioned to provide shelter for the operator or passenger from the elements, i.e., rain or bright sunshine, when in the open position.

The present invention comprises a mounting bracket attached to a base for mounting a lower support rod in turn connected to an upper support rod slideably supporting a basket-type umbrella handle support to receive and support the upright handle of an umbrella. The mounting bracket comprises a threaded lock knob which cooperates with the mounting bracket and a lower end of the lower support rod having a bend for mounting in an upright position. The lower support rod comprises an other end for receiving an end of the upper support rod mounted in an upright position with an other end having a spoon shape adapted to rest adjacent to and support the umbrella shaft. A diagonal bend is provided in the upper support rod forming a lower portion thereof below the bend which is generally parallel with the handle of the umbrella and offset sufficiently to accomodate the handle.

The umbrella holder provides multiple component support by means of a plurality of upper shaft support members, a plurality of lower basket support members, and an adjustable bracket means to hold slideably the lower basket support members on an upright upper support rod to adjust the position an umbrella heightwise to suit the individual user's needs.

The open cage construction of the lower handle support members provides for easy insertion and removal of an umbrella, while upper and lower quick release fabric fasteners furnish firm gripping action, when closed around the handle and shaft portion of an umbrella. The multiple upper support members being spaced apart from the lower support members provide improved support for the handle as well as the shaft of an umbrella to better resist tipping and bending external forces, especially wind action.

Adjustable bracket means are provided to hold components of the umbrella holder in upright relation to a stationary or mobile base.

BRIEF DESCRIPTION OF THE DRAWINGS

FIG. 1 is a side elevation of the umbrella holder with the umbrella handle and shaft fastened in place.

FIG. 2 is a view in section taken on an enlarged scale on the line 2—2 in FIG. 1.

FIG. 3 is a perspective view of preferred embodiment umbrella holder in attachment with the back seat of a golf cart;

DESCRIPTION OF THE EMBODIMENTS

In FIGS. 1, 2 and 3 is shown an umbrella holder 10 constructed in accordance with an embodiment of this invention. As illustrated in FIG. 3, the umbrella holder 10 is shown in association with a golf cart seat 14 shown in dotted lines, such as a Yamaha G-1 golf cart, which serves as a base mount. In FIG. 1, the umbrella holder 10 for engaging the umbrella in an open mode is shown in association with an umbrella handle 11 having a shaft 12. The umbrella holder 10 includes a basket type umbrella handle support 16 which includes two coaxially aligned basket rings 18 in parallel relationship and constructed of heavy guage wire. The generally horizontally disposed basket rings 18 are fastened securely to a generally vertically disposed L-wire 20, and are intermediately positioned between L-wire 20 and support rib 22. Support rib 22 is formed from wire in an elongated generally circular shape extending vertically upward from the lower distal end of L-wire 20. A pencil holder 24 is securely attached to and in parallel relationship with support ribs 22 and also extends upwardly from the distal end of L-wire 20.

As illustrated in FIG. 1, self-locking screw 26 attaches lower strap 28 to L-wire 20. Lower strap 28 is constructed of hook and loop fabric for providing a secure but quick release fastening means. L-wire 20 securely fastened to hub 30 which includes threaded shaft 31 in association with adjustment knob 34, said hub 30 being slideably mounted on upper support rod 36. Inward displacement of threaded shaft 31 by turning adjustment knob 34 compresses nylon button 32 against support rod 36 serving to hold the hub in a given vertical position.

As shown in FIGS. 1 and 3, upper support rod 36 having an upper distal end and a lower distal end is formed with a diagonal bend 37 to position a spoon portion 38 formed integrally with the upper distal end of upper support rod 36 in coaxial alignment with basket rings 18. Attached by self-locking screw 26 adjacent to and immediately below spoon portion 38 is upper strap 40 constructed of the same hook and loop quick release fabric as lower loop 28. The lower distal end of upper support rod 36 is threaded to cooperate with rod holder insert 44 disposed in the interior of lower support rod 46. Cap 48 is provided to enclose the upper distal end of lower support rod 46 and receive the lower threaded extremity of support rod 36. Lower support rod 46 is formed with a bend to extend generally horizontally toward a base support means which in the preferred embodiment is the back of golf cart seat 14. As seen in FIG. 1, the lower distal end of lower support rod 46 is provided with threaded insert 50 which is adapted to receive a threaded shaft 52 attached to a lock knob 54. Cup washers 55 fit on the threaded shaft 52 to provide locking action when threaded shaft 52 is cooperatively inserted in an aperature provided in a generally "V" shaped mounting bracket 56 to engage the lower distal end of lower support rod 46 fitted in a pointed midsection area of mounting bracket 56.

As illustrated in FIG. 3, umbrella holder 10 is secured in an upright position by the cooperation of the mounting bracket 56 with seat support tubing 57 shown in dotted lines of the seat 14 at the back of a golf cart (not shown). When mounted, carriage bolts 64 are received by aperatures provided in tabs 68 formed in pairs at opposite distal ends of mounting bracket 56 which cooperates with seat support tubing 57. Mounting is accomplished by, with the point of the "V" shaped mounting bracket 56 facing upwardly, the pair of tabs 68 sliding over seat support tubing 57 until carriage bolts 64 come to rest thereon. Bolt and washer fastening means are provided for holding tabs 68 in engagement with seat support tubing 57. Lower support rod 46 is assembled into mounting bracket 56 and fastened by the cooperation of lock knob 54 displacing threaded shaft inwardly into threaded insert 50. Once the umbrella is attached, the basket type handle support 16 can be adjusted to suit individual needs.

What is claimed is:

1. An umbrella holding apparatus for securely holding an umbrella having a shaft and a handle at one end of the shaft in an upright position in an unfurled condition to a base member, such as a golf cart, and which apparatus comprises:
   (a) a mounting bracket adapted to be secured to the base member;
   (b) a locking means to secure the mounting bracket to the base member;
   (c) a lower support rod having a one end and other end, the lower support rod having a bend therein and the lower support rod secured at the one end to the mounting bracket and with the other end extending in a generally upright position;
   (d) an upper support rod mounted in an upright position and having a one and other end, one end secured to the upright other end of the said lower support rod and the other end adapted to rest adjacent to and against the umbrella shaft to provide support therefor, the upper support rod having a diagonal bend therein and forming lower and upper straight portions thereof below and above the diagonal bend, the lower portion adapted to be generally parallel with the handle of the umbrella and offset sufficiently to accommodate the handle and the upper portion adapted to be generally closely parallel to the umbrella shaft above the umbrella handle, the upper portion extending inwardly toward the umbrella shaft at the other end;
   (e) a basket-type umbrella handle support and receiving means to receive and support surroundingly the upright handle of the umbrella;
   (f) adjustable means to provide for the heightwise positioning of the handle support and receiving means with the handle on the lower portion of the upper support rod;
   (g) umbrella handle securing means to secure the umbrella handle in the basket type means to permit the rapid securing and releasing of the umbrella handle in the basket receiving and support means; and
   (h) umbrella shaft securing means to secure the umbrella shaft above the umbrella handle to the portion of the upper support rod above the diagonal bend and below the other end of the upper support rod to permit the rapid securing and releasing of the umbrella shaft in conjunction with the securing and releasing of the umbrella handle.

2. The umbrella holding apparatus of claim 1 wherein the mounting bracket comprises a generally inverted V-shaped bracket having a pair of tabs at each end adapted to be clamped on adjacent seat supports on the golf cart and to provide for the lower support rod to extend between the golf seats.

3. The umbrella holding apparatus of claim 2 wherein the locking means comprises a lock knob and threading means received by an aperture at the intersection of the V-shaped mounting bracket and one end of the lower support rod.

4. The umbrella holding apparatus of claim 1 wherein the basket-type umbrella handle support and receiving means comprise a plurality of spaced apart basket rings in parallel relationship affixed intermediately to a generally vertical L-wire attached to a hub for slidable mounting on the lower straight portion of the upper support rod.

5. The umbrella holding apparatus of claim 1 which includes a pencil holder adjacent the basket-type umbrella handle support and receiving means.

6. The umbrella holding apparatus of claim 1 wherein the adjustable means comprises a slidable hub mounted on the upper support rod and provided with threadable locking means to lock the handle support and receiving means at a desired height.

7. The umbrella holding apparatus of claim 1 wherein the umbrella handle securing means comprises a strap constructed of hook and loop fastener fabric and secured to the umbrella handle support and receiving means, and the umbrella shaft securing means comprises a strap constructed of hook and lop fastener fabric and secured to the upper support rod.

8. The umbrella holder apparatus of claim 1 wherein the other end of the upper support rod is formed to provide a spoon portion to fittably rest against the umbrella shaft.

9. A golf cart which comprises a base member and which includes the umbrella holder apparatus of claim 1 secured to the golf cart.

10. The golf cart of claim 9 which includes an umbrella secured to the umbrella holder.

11. An umbrella holding apparatus for securely holding an umbrella having a shaft and a handle at one end of the shaft in an upright position in an unfurled condition to a base member, such as a golf cart, and which apparatus comprises:
  (a) the base member comprises a golf cart provided with a seat member and a seat support;
  (b) a generally inverted V-shaped mounting bracket adapted to be secured to the base member comprising a pair of tabs extending outwardly from each end adapted to be clamped on a seat support on the golf cart;
  (c) locking means to secure the post bracket to the base member comprising a lock knob and threading means received by an aperture at the intersection of the V-shaped mounting bracket and one end of the lower support rod;
  (d) a lower support rod having a one end and other end and having a bend therein and the lower support rod secured at the one end to the post bracket rod and with the other end extending in a generally upright position;
  (e) an upper support rod mounted in an upright position and having a one and other end, one end secured to the other end of the said lower support rod and the other end is formed to provide a spoon portion to fittably rest adjacent to and against the umbrella shaft to provide support therefor, the upper support rod having a diagonal bend therein and forming a lower and upper straight portion thereof below and above the bend, the lower portion adapted to be generally parallel with the handle of the umbrella and offset sufficiently to accommodate the handle and the upper portion adapted to be generally closely parallel to the umbrella shaft above the umbrella handle, the upper portion extending inwardly toward the umbrella shaft at the other end;
  (f) a basket-type umbrella handle support and receiving means to receive and support the upright handle of the umbrella comprising a plurality of basket rings in spaced apart parallel relationship affixed intermediately to a generally vertical L-wire attached to a hub for slidable mounting on the lower straight portion of the upper support rod;
  (g) adjustable means to provide for the heightwise positioning of the handle support and receiving means with the handle on the lower portion of the upper support rod comprising a slidable hub mounted on upper support rod provide with threadable locking means;
  (h) umbrella handle securing means to secure the handle in the basket type means and to permit the rapid securing and releasing of the umbrella handle in the basket type means comprising a strap constructed of hook and loop fabric secured to the basket type means;
  (i) umbrella shaft securing means to secure the umbrella shaft above the umbrella handle and below the spoon portion to the upper support rod above the upper support rod bend, and to permit the rapid securing and releasing comprising a strap constructed of hook and loop fastener fabric, and
  (j) a pencil holder adjacent the basket type umbrella handle support.

12. An umbrella holding apparatus of claim 11 which includes a golf cart and an umbrella secured to the umbrella holder.

* * * * *

UNITED STATES PATENT AND TRADEMARK OFFICE
CERTIFICATE OF CORRECTION

PATENT NO. : 4,974,807

DATED : December 4, 1990

INVENTOR(S) : Joseph H. Moineau

It is certified that error appears in the above-identified patent and that said Letters Patent is hereby corrected as shown below:

Title page, column 1, identification number [73], delete "Specialities" and insert --Specialties--.

Signed and Sealed this

Thirty-first Day of March, 1992

Attest:

HARRY F. MANBECK, JR.

*Attesting Officer*      *Commissioner of Patents and Trademarks*